United States Patent
Abiko et al.

(10) Patent No.: US 7,877,616 B2
(45) Date of Patent: *Jan. 25, 2011

(54) DATA MANAGEMENT SYSTEM, DATA PROCESSING SYSTEM, AND COMPUTER-READABLE MEDIUM HAVING ON WHICH DATA MANAGEMENT PROGRAM IS RECORDED

(75) Inventors: Yukihiro Abiko, Kawasaki (JP); Yoshiyuki Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

This patent is subject to a terminal disclaimer.

(21) Appl. No.: 12/010,748

(22) Filed: Jan. 29, 2008

(65) Prior Publication Data

US 2008/0141045 A1 Jun. 12, 2008

Related U.S. Application Data

(62) Division of application No. 10/092,794, filed on Mar. 8, 2002, now Pat. No. 7,350,084.

(30) Foreign Application Priority Data

Oct. 25, 2001 (JP) .............................. 2001-327302

(51) Int. Cl.
G06F 12/14 (2006.01)
G06F 17/30 (2006.01)
(52) U.S. Cl. ....................................... 713/193; 726/27
(58) Field of Classification Search ................. 713/193; 726/27

See application file for complete search history.

(56) References Cited

U.S. PATENT DOCUMENTS

| | | | | |
|---|---|---|---|---|
| 5,584,023 | A | * | 12/1996 | Hsu ............................ 707/204 |
| 6,327,652 | B1 | | 12/2001 | England et al. |
| 6,836,888 | B1 | * | 12/2004 | Basu et al. .................. 718/104 |
| 6,981,141 | B1 | | 12/2005 | Mahne et al. |
| 7,069,591 | B1 | * | 6/2006 | Weicher ...................... 726/26 |
| 2003/0007635 | A1 | | 1/2003 | Li et al. |
| 2003/0028765 | A1 | * | 2/2003 | Cromer et al. .............. 713/164 |

(Continued)

FOREIGN PATENT DOCUMENTS

JP 8-87440 4/1996

(Continued)

OTHER PUBLICATIONS

Elrod, Elliot. "Partitioning Your Hard Drive". Beyond the Basics. Sep. 2000. pp. 1-6.

(Continued)

*Primary Examiner*—Michael Pyzocha
(74) *Attorney, Agent, or Firm*—Staas & Halsey LLP

(57) ABSTRACT

A data management system including a storage and activating an application so that the application accesses contents in the storage and processes the contents. The data management system also monitors access of the application to the contents by associating information for the application brought into an activated status with information for the accessed contents. The data management system also enciphers the contents with the application information when the activated application writes the contents into the storage while deciphering the contents with the application information when the activated application reads out the contents.

10 Claims, 7 Drawing Sheets

U.S. PATENT DOCUMENTS

2003/0120604 A1* 6/2003 Yokota et al. .............. 705/57
2003/0233564 A1 12/2003 LaRose et al.

FOREIGN PATENT DOCUMENTS

| JP | 2000-207200 | 7/2000 |
| JP | 2000-311114 | 11/2000 |
| JP | 2000-330870 | 11/2000 |

OTHER PUBLICATIONS

Thiel, Thomas "MEMSY—Operating System Architecture" Mar. 27, 1995, pp. 1-4. <http://www4.informatik.uni-erlangen.de/Projects/MEMSY/os-arch.html>.
Japanese Patent Office Notice of Reasons for Rejection, mailed Aug. 28, 2007 and issued in priority Japanese Patent Application No. 2001-327302.
Non-Final Office Action mailed on Jul. 9, 2009 in corresponding U.S. Appl. No. 12/010,747.
Final Office Action mailed on Dec. 30, 2009 in corresponding U.S. Appl. No. 12/010,747.
Office Action mailed Dec. 12, 2005 in U.S. Appl. No. 10/092,794.
Notice of Non-Compliant Amendment mailed Mar. 29, 2006 in U.S. Appl. No. 10/092,794.
Office Action mailed Jul. 3, 2006 in U.S. Appl. No. 10/092,794.
Office Action mailed Feb. 12, 2007 in U.S. Appl. No. 10/092,794.
Office Action mailed Jun. 28, 2007 in U.S. Appl. No. 10/092,794.
Notice of Allowance mailed Oct. 30, 2007 in U.S. Appl. No. 10/092,794.
Communication mailed Jan. 15, 2008 in U.S. Appl. No. 10/092,794.
Issue Notification mailed Mar. 5, 2008 in U.S. Appl. No. 10/092,794.
U.S. Patent No. 7,350,084 issued Mar. 25, 2008.

* cited by examiner

DATA MANAGEMENT SYSTEM, DATA PROCESSING SYSTEM, AND COMPUTER-READABLE MEDIUM HAVING ON WHICH DATA MANAGEMENT PROGRAM IS RECORDED

CROSS-REFERENCE TO RELATED APPLICATIONS

This application is a divisional application of application Ser. No. 10/092,794, filed Mar. 8, 2002, now U.S. Pat. No. 7,350,084, it being further noted that foreign priority benefit is based on Japanese Patent Application No. 2001-327302 filed Oct. 25, 2001, the disclosures of which are incorporated herein by reference.

BACKGROUND OF THE INVENTION

1. Field of the Invention

The present invention relates to a technology for protecting copyrights of various types of digital contents when the copyrights of such digital contents are executed in a system which is composed of a recording reproducing apparatus such as a hard disk recorder, a data processing system such as a personal computer and so on.

2. Description of the Related Art

Recently, technologies for digitizing information is developed, storage units for storing information therein tend to become large in capacity, and broadband networks are widely deployed. With this tendency, contents containing video data (moving picture data), audio data, image data and so on tend to be formed into digital information and stored in various types of recording media such as storage units, rewritable media and so on.

However, when such technology development makes it easy for a user to effect data conversion from one type into another one, with intention or without intention, the user tends to distribute or transfer the data without license of the copyright holder of the contents, with the result that copyrights will often suffer from risk of infringement.

For this reason, in order to protect copyrights of the contents, technologies for enciphering such copyright materials have been developed so far. When such technologies are introduced into a situation where the copyright materials are handled with a data management system, encryption data (hereinafter referred to as enciphered data) becomes meaningless unless a key for deciphering the ciphertext is obtained. Therefore, it follows that the encryption system is effective for protecting copyrights.

However, when an application software (hereinafter simply referred to as application) is activated to access the enciphered data for utilizing the data, it becomes necessary to decipher the enciphered data and store the same in a recording medium. In this way, when the data is once deciphered to be a plaintext and the resulting plaintext is stored in the recording medium, the user becomes allowed to carry out any operation such as transferring, copying, falsification and so on. Thus, there can be a concern that the copyright protection does not function in this situation.

In order to cope with this situation, there has been proposed a technology which is disclosed in Japanese Patent laid-open gazette No. 2000-311114, No. 2000-330870 or the like.

According to the technology disclosed in the gazettes, when a rewritable medium is utilized, a media ID (Identification) inherent to the medium is utilized as the encryption key. As for a medium having no media ID, an encryption key written in a read-in region, an exchange processing region, a ROM (Read Only Memory) which a file system is ordinarily prohibited to access, is utilized. As for a medium having no particular ROM region such as a hard disk drive or the like, a device ID involved in a BIOS (Basic Input Output System) in a concealing manner is utilized as the encryption key. According to the technology disclosed in the aforesaid gazette, data enciphered with these types of encryption keys is stored in a medium, whereby the copyright protection is made effective.

Meanwhile, if a storage medium containing an enciphered copyright material (contents) is additionally attached to a personal computer, data recording reproducing apparatus or the like which is operated without copyright protection function, a situation can be brought about in which a storage medium with no encryption function (hard disk for storing data of no necessity in undergoing encryption processing) and a storage medium with encryption function (hard disk designed for storing encrypted data) are operated in a mixed fashion.

Under this situation, if an application is activated to read the enciphered data and utilize the same, the data of copyright material released from enciphered status can be wholly or partly read, with the result that the data of copyright material can be transferred from one person to another without regulation. The aforesaid conventional technology does not mention any countermeasure against the situation where the material can suffer from copyright infringement.

For example, an assumption is introduced that when an editing application is activated to change the data, the data in the halfway of processing stage may be temporarily stored in a file or a memory file. In this case, the temporary stored file having contents meaningful as a copyright material is created in a medium other than a medium as an object of encryption. That is, data having not undergone enciphering process is stored in the file or the memory file. At this time, if a system for protecting copyrights is tried to be built by using an existing file system, then a converting work is requested, i.e., all data stored in the hard disk are enciphered. However, if such system were built, even the copyright holder or a person licensed by the copyright holder can be stringently restricted upon executing the copyrights. Therefore, the copyrights cannot be executed in a reasonable manner.

SUMMARY OF THE INVENTION

The present invention is made in view of the above aspect. Therefore, it is an object of the present invention to provide a system which can reliably protect a copyright of contents of a deciphered version without unreasonably restricting the execution of the copyright even if a storage medium having no encryption function and a storage medium having an encryption function are placed under processing in a mixed fashion.

According to the present invention, in order to attain the above object, there is provided a data management system including a storage medium for storing contents, application executing means for activating an application so that the application accesses the contents stored in the storage medium and effects a processing on the contents, access monitoring means for monitoring the status of access of the application to the contents by associating inherent information for the application brought into an activated status by the application executing means, with inherent information for the contents accessed by the application, and filtering means for enciphering the contents with the inherent information for the application when the application under the activated status writes the contents into the storage medium while deciphering the contents with the inherent information for the application when the application under the activated status reads out the contents from the storage medium.

The data management system as set forth above may be further arranged to include an operating system as a software for controlling the execution of the application, the operating system assigning identification information to each process upon executing the application by the application executing means, wherein the access monitoring means utilizes the identification information as the inherent information for the application.

The data management system as set forth above may be further arranged in such a manner that the access monitoring means registers the inherent information for the application and the inherent information for the contents in a management table so that the inherent information for the application and the inherent information for the contents are associated with each other, and that the access monitoring means monitors the status of access with the assistance of the management table.

In this case, the data management system may be further arranged in such a manner that at least one piece of logical drive is built in the storage medium and the contents is reserved in the logical drive, a file system for managing the logical drive is built in each of the logical drive, and at least one file system is arranged to serve as an encryption file system which has a cryptographic attribute determined for each file or folder containing the contents, enciphers the contents at each file or folder upon storing the contents in the storage medium. Alternatively, the data management system may be further arranged to have an encryption file system which enciphers the file system as a whole upon storing the contents in the storage medium.

Further, according to the present invention, there is provided a data processing apparatus arranged to include the application executing means, the access monitoring means, and the filtering means, each of which being described above.

Furthermore, according to the present invention, there is provided a recording medium capable of being read by a computer having recorded thereon a data management program which forces the computer to realize a function for protecting a copyright of contents stored in a storage medium when an application accesses the contents to effect a processing on the contents, wherein the data management program forces the computer to function as the access monitoring means and the filtering means.

As described above, according to the present invention, when an application accesses the contents stored in the storage medium, the status of access is monitored at each application (process). Thus, the contents read and utilized by the application are enciphered and/or deciphered by using the inherent information of the application.

According to the above arrangement, even if the user is placed under an environment where the storage medium having no encryption function and the storage medium having an encryption function are utilized in a mixed fashion, and the user drives the data management system in such a manner that the application reads the enciphered contents stored in the storage medium having an encryption function and temporarily stores the contents in the storage medium having no encryption function, the following advantages can be obtained. That is, the copyright concerning the material can be comfortably utilized by an authorized user, i.e., the copyright can be free from unreasonable restriction, the copyright of the contents released from encryption can be reliably protected, and great contribution can be expected to the performance improvement in the data management system.

In other words, when digitized copyright material data (digital contents) is stored in a storage medium, the digitized copyright material data is once enciphered and thereafter stored in the storage medium. Therefore, the copyright of the material data can be effectively protected from a copyright violation which can be brought about when the user unintentionally transfers the copyright material data to a third party who is unauthorized in executing the copyright. Moreover, if a malicious person tries to detach the storage medium from the system and open the file containing the copyright material data, this person will surely fail in obtaining meaningful data because the data are fundamentally composed of a ciphertext. Thus, the copyright of the material data is effectively protected from infringement.

In this case, one of recommendable arrangements is that dynamically determined information such as identification information given to each process (process ID) assigned by the operating system is utilized as inherent information for the application, and this information is utilized for enciphering the contents. With this arrangement, even if the application identical to the application activated upon enciphering the contents is activated for deciphering the contents, the contents will be resistant to the deciphering process because of the difference in timing of activation. Accordingly, data deciphered by means of the file created in the storage medium will not go into a transaction process with ease, with the result that the copyright can be more reliably protected from violation.

Further, the data management system is arranged so that the filtering means is switched from the valid mode to the invalid mode in its operation only when the user authentication is successfully carried out, and the copyright holder himself or herself or a person licensed by the copyright holder (e.g., a person creating a secondary copyright material by editing the original material) are registered in advance in the data management system. With this arrangement, the copyright holder himself or herself or the person licensed by the copyright holder can make the filtering means invalid in its operation. Thus, the editing work or the like will not suffer from unreasonable restriction, the copyright will be free from restriction upon executing the copyright, with the result that it becomes possible to avoid copyright infringement.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF THE PREFERRED EMBODIMENTS

Embodiments of the present invention will be hereinafter described with reference to the attached drawings.

Figure 1:
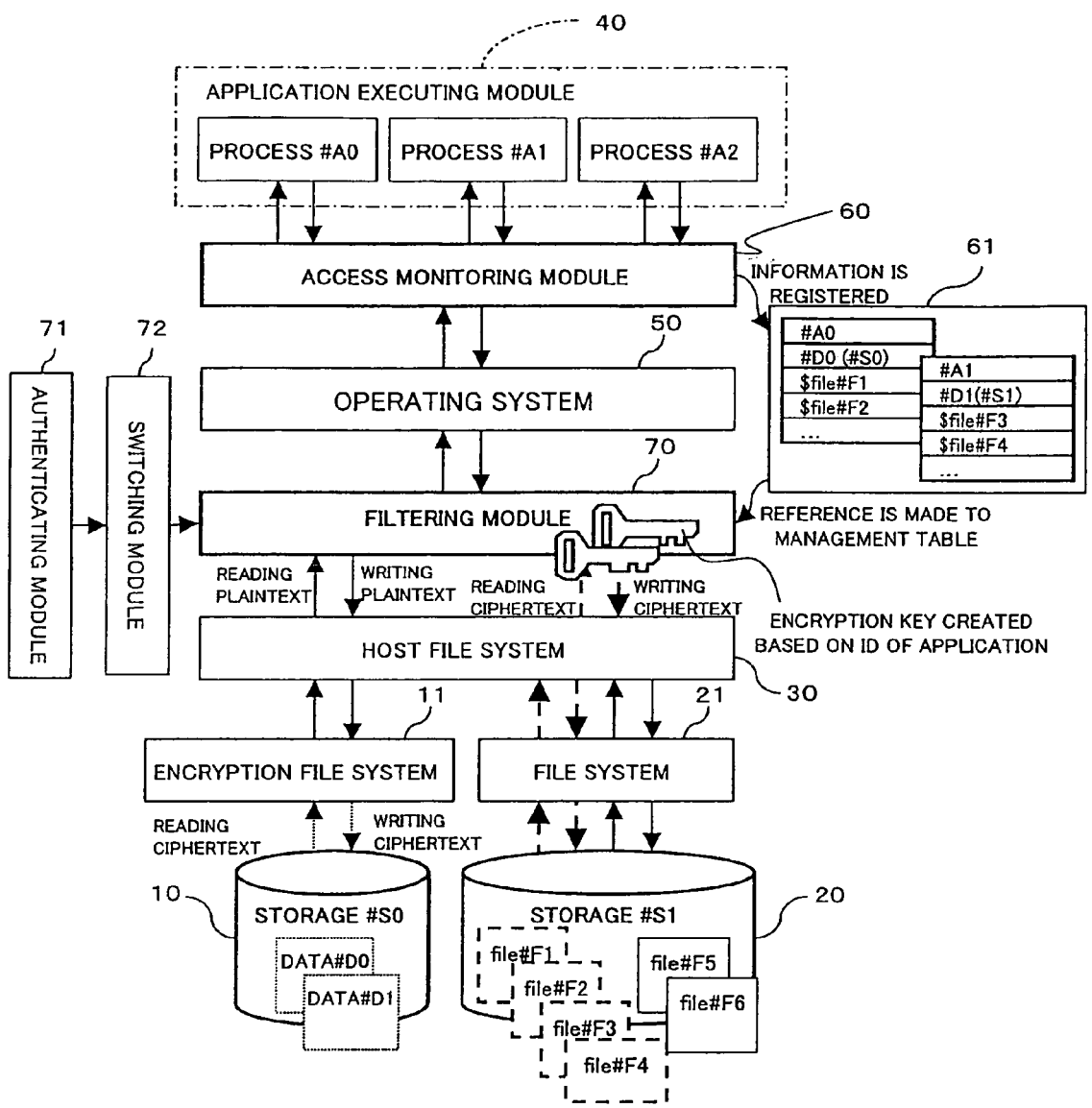
FIG. 1 is a block diagram showing an arrangement of a data management system as a first embodiment of the present invention.

FIG. 1 is a block diagram showing an arrangement of a data management system as a first embodiment of the present invention. As shown in FIG. 1, the data management system of the first embodiment is built in a general-purpose personal computer (data processing apparatus), for example. The data management system is arranged to include a storage unit 10, an encryption file system 11, a storage unit 20, a file system 21, a host file system 30, an application executing module 40, an operating system 50, an access monitoring module 60, a filtering module 70, an authenticating module 71, and a switching module 72.

The data management system of the first embodiment is provided with two sets of storage units 10 and 20, and each of the storage units 10 and 20 has a single set of logical drive built therein. In the example shown in FIG. 1, the logical drives built in the storage units 10 and 20 have drive names of #S0 and #S1, respectively.

The storage unit 10 is a unit for functioning as a first storage unit (storage medium having an encryption function) containing a logical drive managed by the encryption file system 11 which will be described later on. The encryption file system 11 has a cryptographic attribute determined for each file or folder containing the contents, enciphers the contents at each file or folder upon storing the contents (copyright material file) in the storage unit 10. Alternatively, the encryption file system 11 enciphers the file system as a whole upon storing the contents (copyright material file) in the storage 10.

Accordingly, when data is written in the logical drive of the storage unit 10, the data is enciphered by the encryption file system 11 and thereafter written in the storage unit 10. On the other hand, when data is read from the logical drive of the storage unit 10, the enciphered data is deciphered by the encryption file system 11 and thereafter read from the storage unit 10. Meanwhile, the example shown in FIG. 1 has a status in which two copyright material files (the file name thereof are #D0 and #D1, respectively) of a ciphertext version are stored in the storage unit 10.

The storage unit 20 is a unit for functioning as a second storage unit (storage medium having no encryption function) in which there are stored the contents enciphered by the filtering module 70 which will be described later on. The logical drive built in the storage unit 20 is managed by the file system 21 such as of a FAT (File Allocation Table) or the like. In the example shown in FIG. 1, four files (the file names thereof are #F1 to #F4, respectively) of a ciphertext version and two files (the file names thereof are #F5 and #F6, respectively) of a plaintext version are stored in the storage unit 20.

The host file system 30 is a unit for managing both of the encryption file system 11 and the file system 21. The host file system 30 is provided between these file systems 11 and 21 and the filtering module 70 which will be described later on.

The application executing module (application executing means) 40 is a unit for activating an application so that the application accesses the contents stored in the storage units 10 and 20 and effects processing on the contents.

The operating system 50 is a software for controlling the execution of the application. The operating system 50 of the present embodiment is designed to handle a plurality of tasks in a multiprocessing manner. That is, when the application execution module 40 activates the application, the operating system 50 attaches identification information (process ID) to each process, whereby an application can be called by using the process ID, or a proper API (Application Program Interface) of the file system 11 and 21 can be called depending on the storage units 10 and 20 when the application calls the file systems 11 and 21.

In the example shown in FIG. 1, process IDs #A0 and #A1 are assigned to two processes executed by the application which is activated for accessing the copyright material stored in the storage unit 10 while process ID of #A2 is assigned to a process executed by an application which is activated without accessing the copyright material stored in the storage unit 10. These processes #A0 to #A2 may be executed by not only a single set of application but also applications different from one another.

The application may be designed to be operated on a general-use personal computer. Thus, the application need not be specifically designed for use in the data management system of the present invention. An editing software, the Web-browser and so on can be named as an example of such kind of application. When the application is executed by the application executing module 40, an operation of each application are managed by the operating system 50 as a process.

The access monitoring module (access monitoring means) 60 is a module for registering inherent information for the application operated by the application executing module 40 and inherent information for the contents, which each of the applications (each process) accesses, in a management table (list) 61, so that the inherent information for the application and the inherent information for the contents are associated with each other. Further, the access monitoring module 60 utilizes the management table 61 for monitoring the status of access to the contents by each application.

At this time, according to the present embodiment, a process ID assigned from the operating system 50 to each process is utilized as the inherent information for the application, and a file name of a copyright material file containing the contents or a drive name of a logical drive containing the copyright material file is utilized as the inherent information for the contents (see Function (1) which will be described later on).

When the application executing module 40 completes the execution of the application (process), the access monitoring module 60 deletes the inherent information for the application (process ID) and the inherent information for the contents (file name) corresponding to the application in the management table 61.

The access monitoring module 60 monitors how the application accesses the file, creates a list (management table 61) of the file names of the copyright material as a target of file access each time the application (process) makes access to the material, and memorizes the file name until the process of the application is completed. In particular, when the operating system 50 assigns a process ID to the application, the access monitoring module 60 registers and memorizes this process ID in the list as inherent information of the application (process).

The access monitoring module 60 of the present embodiment may be arranged to have the following functions (1) to (5).

Function (1): Function that when the application reads the copyright material file (contents) stored in the storage 10 (logical drive #S0) managed by the encryption file system 11, the access monitoring module 60 registers the file name of the copyright material file containing the contents read by the application in the management table 61 as the inherent information for the contents. The file name to be registered in the table contains a drive name of the logical drive in which the contents read out by the application is stored.

Function (2): Function that when the application effects a processing on the contents to create a new file, then the access monitoring module 60 registers a file name generated for the new file in the management table 61 so that the file name and the inherent information (process ID) for the application are associated with each other. At this time, the access monitoring module 60 may change the file name of the new file partly or wholly, and register the changed name in the management table 61. The file name utilized in this case is composed of a series of characters containing the drive name of the logical drive in which the file is stored. The part of the character series indicating the drive name may be changed so as to change the destination medium (storages 10 and 20) in which the file is stored. Also, the part of the character series may be changed so that the file is temporarily stored in a primary storage means (storage medium; not shown) as a memory file. Further, a file name of a copyright material file read out from the encryption file system 11 (storage 10) may be registered and memorized as the file name of the new file.

Function (3): Function that the access monitoring module 60 compares a drive name of the logical drive as a destination for storing a file, which is newly created when the application effects a processing on the contents, with a drive name (drive name contained in the file name) of the logical drive registered in the management table 61 owing to Function (1), and if it is determined that both of the drive names disagree with each other as the result of comparison, then the access monitoring module 60 changes a file name of the newly created file so that the newly created file is stored in the logical drive of the drive name registered in the management table 61 and registers the changed file name in the management table 61. That is, if there is difference between the logical drive in which the newly created file is to be stored and the logical drive in which the contents (copyright material file) has been stored, the file name is changed so that the new file is created at the same logical drive (the same storage 10) and registration is made in the management table 61. With this Function (3), the newly created file can be created and stored at the same logical drive (same storage unit 10) as that of the original contents. Thus, the file created based on the contents read out from the storage unit 10 having the encryption function is once enciphered by the encryption file system 11 and thereafter written into the storage unit 10.

Function (4): Function that the access monitoring module 60 compares a drive name of the logical drive as a destination for storing a file, which is newly created when the application effects a processing on the contents, with a drive name (drive name contained in the file name) of the logical drive registered in the management table 61 owing to Function (1), and if it is determined that both of the drive names are coincident with each other as the result of comparison, then the access monitoring module 60 prohibits a file name of the newly created file from being registered in the management table 61. That is, if the logical drive as the destination for storing the newly created file is coincident with the logical drive in which the contents (copyright material file) is stored, it is reliably expected that the newly created file is subjected to an enciphering process in the encryption file system 11 and then written into the storage unit 10 without undergoing the enciphering process in the filtering module 70, which will be described later on, in advance. Therefore, according to the present embodiment, when it is determined that both of the drive names are coincident with each other, the file name of the newly created file is prohibited from being registered in the management table 61 so that the file name can be protected from being registered or memorized in the table, whereby the filtering module 70 becomes free from useless enciphering operation.

Function (5): Function that the access monitoring module 60 compares a drive name of the logical drive as a destination for storing a file, which is newly created when the application effects a processing on the contents, with a drive name (drive name contained in the file name) of the logical drive registered in the management table 61 owing to Function (1), and if it is determined that both of the drive names disagree with each other as the result of comparison, then as will be described later on the file newly created by the filtering module 70 is once enciphered and thereafter the resultant enciphered version of the newly created file is stored in the logical drive (storage 11) as the destination for storing the file. That is, if there is difference between the logical drive in which the newly created file is to be stored and the logical drive in which the contents (copyright material file) has been stored, then the operation of the filtering module 70 is validated. At this time, by using the above-described Function (2), the file name may be changed partly or wholly and registered in the management table 61 so that the filtering module 70, which will be described later on, temporarily stores the enciphered version of the newly created file as a memory file in the primary storage means instead of the logical drive as the storage destination.

Owing to the above-described function of the access monitoring module 60, the management table 61 shown in FIG. 1 comes to have registered identification information #A0 and #A1 of two processes effected by the application which is activated to access the copyright material in the storage unit 10. As for the process #A0, a file name #D0 (containing a logical drive name #S0) of the copyright material file accessed by the process #A0 is registered in the management table 61. Also, the process #A0 creates and develops a couple of new files $file#F1 and $file#F2 based on the copyright material file #D0, and the names of the files, i.e., $file#F1 and $file#F2, are registered in the management table 61. Similarly, as for the process #A1, a file name #D1 (containing a logical drive name #S0) of the copyright material file accessed by the process #A1 is registered in the management table 61. Also, the process #A1 creates and develops a couple of new files $file#F3 and $file#F4 based on the copyright material file #D1, and the names of the files, i.e., $file#F3 and $file#F4, are registered in the management table 61.

The files $file#F1 and $file#F2 are enciphered by the filtering module 70 which will be described later on, and stored in the storage unit 20 having no encryption function through the file system 21.

Figure 2:
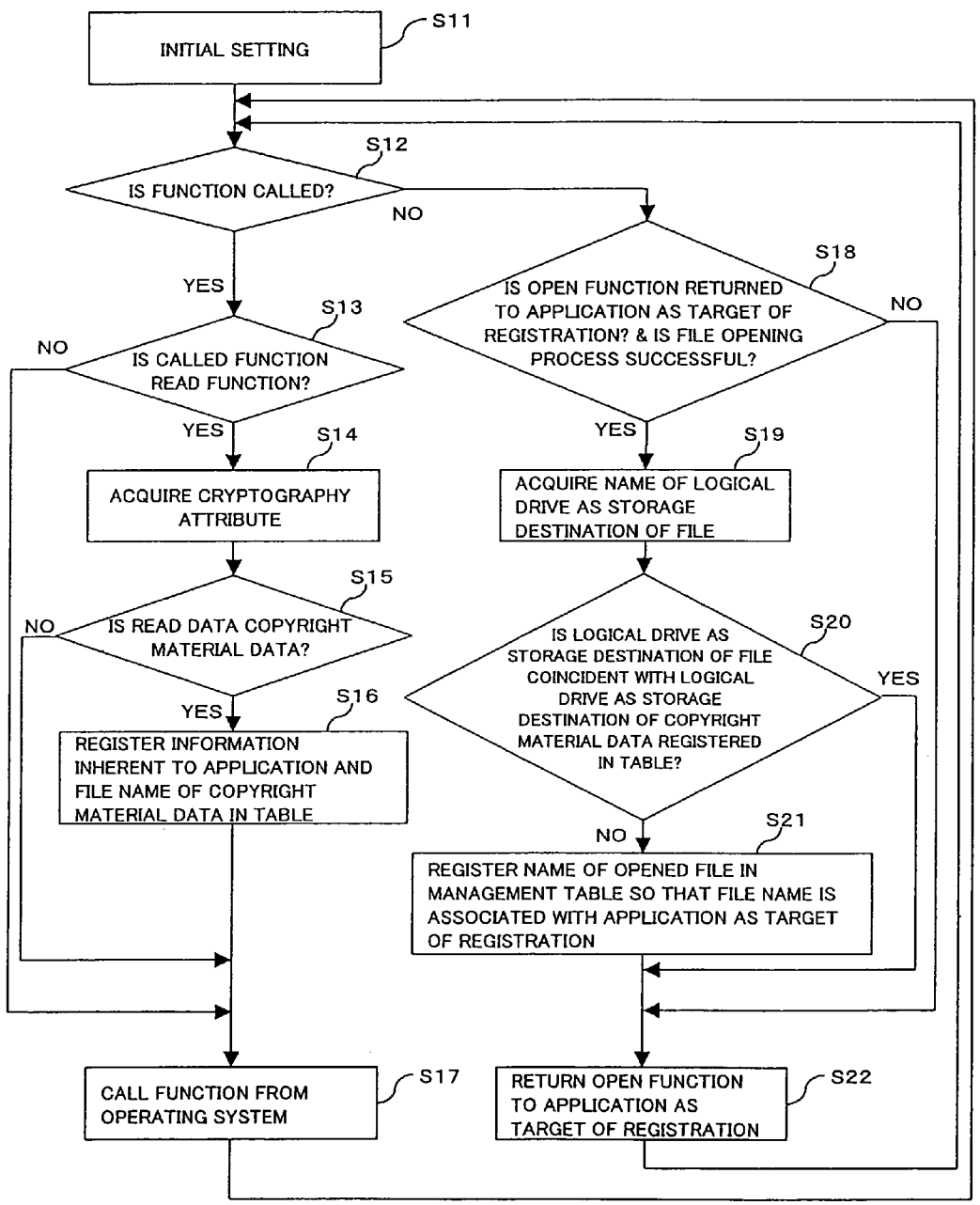
FIG. 2 is a flowchart for explaining a processing procedure of an access monitoring module employed in the data management system as the first embodiment.

A processing procedure of the access monitoring module 60 will be described later on with reference to FIG. 2.

The filtering module (filtering means) 70 referrers to the management table 61 created by the access monitoring module 60. When the application is activated and the process is effected so that data containing the contents are written in a file which is newly created in the storage unit 20 having no encryption function, the filtering module 70 enciphers the data containing the contents (file) with inherent information for the application, i.e., an encryption key created based on the process ID. Conversely, when the activated application (process) is effected so that the data enciphered in a manner as described above are read out from the file stored in the storage unit 20 having no encryption function, the filtering module 70 deciphers the data (contents) with the encryption key created in the above-described manner.

If an enciphered file is simply moved from one storage unit to another storage unit, the filtering module 70 does not execute the enciphering processing or deciphering processing.

Figure 3:
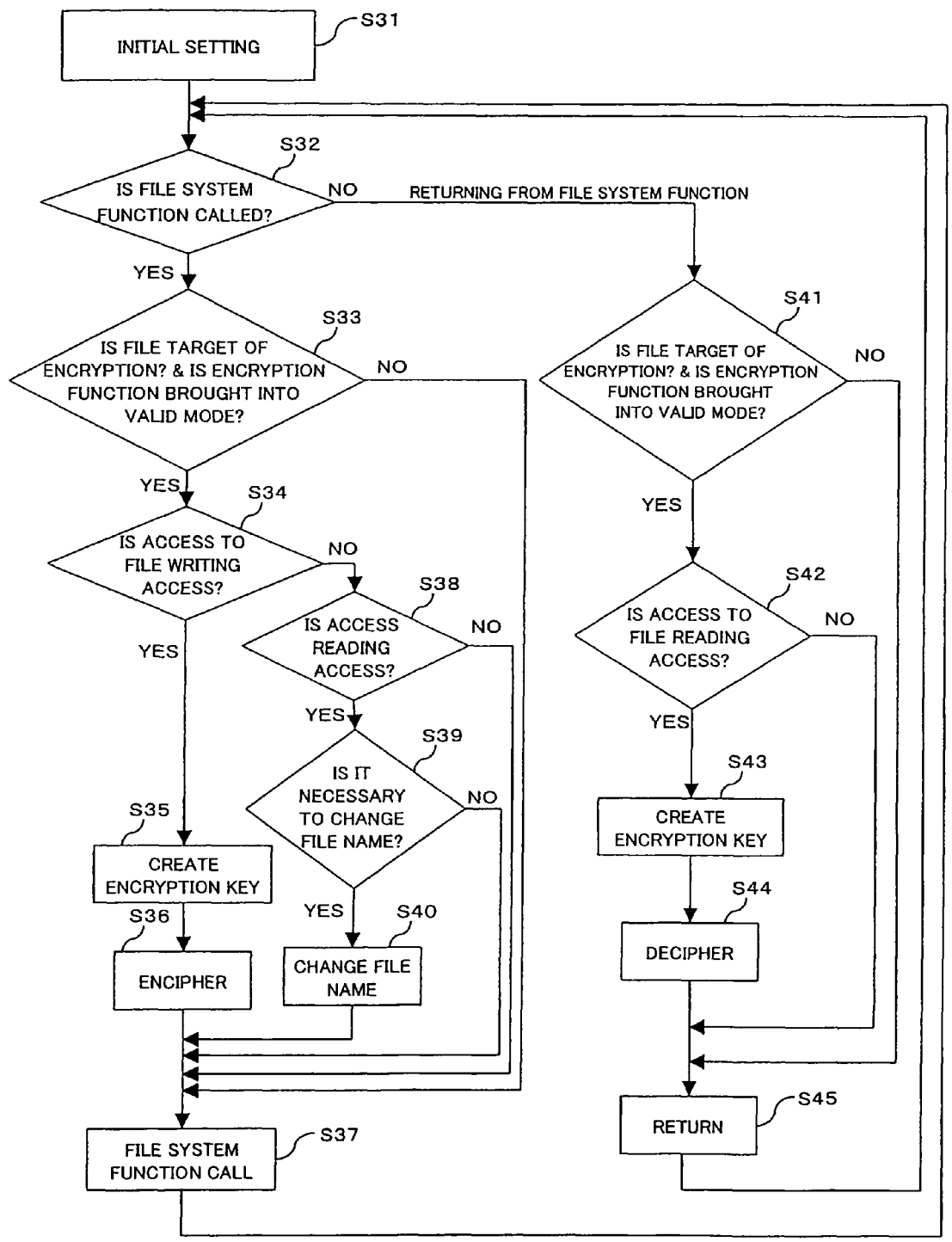
FIG. 3 is a flowchart for explaining a processing procedure of a filtering module employed in the data management system as the first embodiment.

Further, the processing sequence of the filtering module 70 will be described later on with reference to FIG. 3.

Furthermore, the filtering module 70 is provided with a authenticating module 71 and a switching module 72. Thereby, in order to solve any disadvantages upon operating the system, a user can enter a password as described below so that the user is authorized and allowed to switch the mode of operation (processing of enciphering and/or deciphering) of the filtering module 70 between a valid mode and an invalid mode.

The authenticating module (authenticating means) 71 is a unit for carrying out authentication on a user. That is, the authenticating module 71 compares a password entered by the user with a password registered in advance. If they are coincident with each other, then the user having entered the password is authorized.

The switching module (switching means) 72 is a unit for switching the mode of operation of the filtering module 71 between a valid mode and an invalid mode only when the authenticating module 71 successfully carries out the authentication on the user.

The above-described application executing module 40, access monitoring module 60, filtering module 70, authenticating module 71 and switching module 72 can be realized by a specifically developed software (data management program).

The data management program may be provided in a style of recording medium such as a flexible disk, a CD-ROM and so on which can be read by a computer. In the present embodiment, the data management program is stored in advance in a ROM (Read Only Memory; not illustrated) unit of a general-purpose personal computer (data processing apparatus). This data management program is read by a CPU (computer; not illustrated) of the general-purpose personal computer (data processing apparatus) and executed, whereby functions of the above-described application executing module 40, access monitoring module 60, filtering module 70, authenticating module 71 and switching module 72 can be realized.

The data management program may be recorded in a recording unit (recording medium) such as a magnetic disk, an optical disk, a magneto-optical disk and so on, and provided from the recording unit to the computer through of a communication path.

The above-described storage units 10, 20 are realized by a RAM (Random Access Memory; not illustrated) built in a computer serving as a general-purpose personal computer (data processing apparatus). Alternatively, the storage units 10, 20 may be realized by a memory unit such as a hard disk drive unit (or a memory unit additionally attached outside the computer).

The operation of the data management system of the first embodiment arranged as described above will be hereinafter described with reference to FIGS. 2 and 3.

Initially, the processing sequence of the access monitoring module 60 of the data management system of the first embodiment will be described with reference to the flowchart (steps S11 to S22) shown in FIG. 2.

The task imposed on the access monitoring module 60 is to avoid such an event that the copyright material data and a part thereof, which are decoded for the sake of the processing of the application, are saved in the storage unit 20 with the data of a plaintext version left not enciphered. To this end, a list of data to be enciphered (management table 61) is created.

The operation therefor will be described with reference to the flowchart shown in FIG. 2. The access monitoring module 60 carries out an initial setting (step S11) and then determines whether or not the application (process) calls a function (Call) for the operating system 50 (step S12). If it is determined that the function call is made (YES route at step S12), then it is examined whether the target function of the calling operation is a read function or not (step S13).

If it is determined that the target function is a read function (YES route at step S13), the cryptographic attribute of the file as a reading target is acquired (step S14). Thereafter, it is examined whether the file is an enciphered copyright material data (copyright material file) or not (step S15). If it is determined that the file is copyright material data (YES route at step S15), inherent information for the application (i.e., process ID assigned by the operating system 50) and a file name of the copyright material data (containing a logical drive name) are registered in the registration table 61 (step S16). At this time, the above-described Function (1) is utilized. Thereafter, the function call (Call) is made for the operating system 50 (step S17) and the processing returns to step S12.

If it is determined that the function as the target of calling operation (Call) is not a read function (NO route at step S13), or alternatively, if the file as the target of reading is not copyright material data but any material unnecessary to be enciphered (NO route at step S15), the processing immediately goes to step S17.

On the other hand, if the application (process) does not effect function call for the operating system 50 (NO route at step S12), then it is examined whether a return for an open function is performed from the operating system 50 to the application as a target of registration or not and whether the file is successfully opened or not (step S18).

If the return for the open function is performed and the file is successfully opened (YES route at step S18), then the drive name of the logical drive in which the file is saved (logical drive as a destination of storage) is acquired (step S19). Then, it is examined whether or not the drive name is coincident with a drive name registered in the management table 61 of which the logical drive as a destination of storage has the copyright material data (copyright material file) stored therein. That is, it is examined whether the logical drive as the storage destination of the file is coincident with the logical drive as the storage destination of the copyright material data (step S20).

If it is determined that the storage destination of the file is different from the logical drive as the storage destination of the copyright material data (NO route at step S20), then the name of the opened file is registered in the management table 61 so that the file name is associated with the inherent information of the application as a target of registration (process ID assigned by the operating system 50). At this time, the above-described Functions (2) and (5) are utilized. Thereafter, the processing returns to the open function for the application as a target of registration (step S22), and the processing returns to step S12.

If the return for the open function is not performed or the processing fails to open the file (NO route of step S18), the processing immediately goes to step S22. Further, even if it is determined that the logical drive as the storage destination of the file is coincident with the logical drive as the storage destination of the copyright material data (YES route of step S20), the registration at step S21 is not carried out and the processing immediately goes to step S22 by a reason which will be described later on. At this time, the above-described Function (4) is utilized. At step S21, the above-described Function (3) may be utilized instead of Function (2).

Now, operation of the access monitoring module 60 will be described in more concrete manner.

Initially, the access monitoring module 60 monitors the status of the application (process) accessing the file. When the application accesses the copyright material data, the access monitoring module 60 acquires inherent information of the application. For example, the access monitoring module 60 activates a wrapper module of a kernel module of the operating system 50 so as to detect a file access API call of the application, whereby a process ID of the application as a source of calling operation. In addition to the process ID, the access monitoring module 60 may acquire information of the application name, the detected time and so on. Further, the access monitoring module 60 acquires a name of a file containing the copyright material data. Then, the acquired inherent information for the application and the name of the file containing the copyright material data are registered in the management table 61 so that the inherent information and the name of the file are associated with each other (step S16). As has been described above, the file name is composed of a series of characters containing the name of logical drive in which the copyright material data is stored.

At step S15, when determination is made on whether the file as a target of reading operation is the copyright material data or not, if it is recognized in advance that the file system utilized as the logical drive having the file saved is an encryption file system, then it becomes permissible for the processing to regard the targeted file of the reading operation as the copyright material data without any other confirmation procedure. In this case, if the encryption file system is setting a cryptography attribute for a file or a folder, the determination may be made on whether or not the file is the copyright material data by using the cryptography attribute.

Further, at step S15, when determination is made on whether the file is the copyright material data or not, the access monitoring module 60 may hook not only the information obtained from the file system but also the authentication procedure upon connecting the system to a server as is done in a situation of Web browser, a streaming video reproduction application or the like. When a streaming video reproduction application is activated, the application sometimes creates an intermediate file for video reproduction in a storage unit. In particular, in a situation where copyright material data is subjected to a streaming processing, unlike in a situation of download processing, it is presupposed that the copyright material is not stored in a storage unit. Therefore, if the access monitoring module 60 hooks the authentication procedure with the streaming video server as described above, then an enciphering processing described later on becomes also applicable to the intermediate file.

On the other hand, the access monitoring module 60 acquires the file name thereof when the application as a target of registration creates a new file, and registers the file name in the management table 61 as a target file of encryption. If the logical drive in which the target file of encryption is stored is same as the logical drive in which the copyright material data accessed by the application as a target of registration is stored (YES route at step S20), the file name need not be registered in the management table 61 by the following reasons.

One of the reasons is that if the logical drive in which the target file of encryption is stored is same as the logical drive (storage 10) in which the copyright material data is stored, then the target file of encryption is automatically enciphered by the encryption file system 11 and stored in the logical drive. The other of the reasons is that if the target file of encryption is stored in the logical drive (storage unit 10) in which the copyright material data is stored, which fact means that the data can be protected from being flowed out therefrom.

Conversely, based on the above reasons, the name of the target file of encryption may be partly changed by using the aforesaid Function (3) at step S21 so that the target file of encryption is stored in the logical drive in which the copyright material data is stored. This scheme will also be effective in protecting the copyright material data. For example, when the application tries to access the target file of encryption, this access is hooked and the character series indicative of the logical drive name corresponding to the file name is changed so that the character series is replaced with the name of the logical drive in which the copyright material data is stored. This scheme is effective when it is requested for the file to be prohibited from being written into a logical drive which is different from that of the copyright material.

When the application executing module 40 terminates the operation of the application as a target of registration, the access monitoring module 60 erases all the data concerning the application from the management table 61. That is, the information inherent to the application, the file name of the copyright material data, the name of the target file of encryption and so on are removed from the management table 61.

Next, the processing sequence of the filtering module 70 employed in the data management system as the first embodiment will be described with reference to the flowchart (steps S31 to S45) shown in FIG. 3.

The filtering module 70 carries out enciphering and deciphering with reference to the management table 61 in response to the file access from the application.

The operation thereof will be described with reference to the flowchart shown in FIG. 3. Initially, the filtering module 70 caries out an initial setting (step S31). Thereafter, it is examined whether the calling (Call) of the file system function or the returning (Return) from the file system function is made or not (step S32). If it is determined that the calling of the file system function is made (YES route of step S32), then it is examined whether or not the file is a target of encryption and the encryption function is brought into a valid mode by the switching module 72 (step S33).

If it is confirmed that the file is a target of encryption and the encryption function is brought into a valid mode by the switching module 72 (YES route of step S33), then it is examined whether the access to the file is a writing access or not (step S34).

If it is determined that the access to the file is the writing access (YES route of step S34), then reference is made to the management table 61 to acquire the inherent information for the application (process ID), an encryption key is created based on the process ID (step S35), and data as a target of writing is enciphered by using the encryption key (step S36). Thereafter, the following processing job is transferred to the file system (i.e., file system function CALL; step S37), and the processing returns to step S32.

If it is determined that the access to the file is not the writing access (NO route of step S34), then it is examined whether the access is a reading access or not (step S38).

If it is confirmed that the access to the file is the reading access (YES route of step S38), then reference is made to the management table 61 to determine whether it is necessary to change the file name or not (step S39).

If it is determined that the file name should be changed (YES route of step S39), then the file name is changed (step S40). Thereafter, the following processing job is transferred to the file system (step S37), and the processing returns to step S32.

If the file is not one as a target of encryption, or the encryption function is not brought into a valid mode by the switching module 72 (NO route of step S33), then the processing immediately proceeds to step S37. Further, if the access to the file as a target of encryption is not a reading access (NO route at step S38), or it is unnecessary to change the file name (NO route at step S39), the processing also immediately proceeds to step S37.

On the other hand, if the processing returns from the file system function (NO route of step S32), then it is examined whether or not the file is a target of encryption and the encryption function is brought into a valid mode by the switching module 72 (step S41).

If it is confirmed that the file is a target of encryption and the encryption function is brought into a valid mode by the switching module 72 (YES route of step S41), then it is examined whether the access to the file is a reading access or not (step S42).

If it is determined that the access to the file is the reading access (YES route of step S42), then reference is made to the management table 61 to acquire the inherent information for the application (process ID), an encryption key is created based on the process ID (step S43), and data as a target of reading is deciphered by using the encryption key (step S44). Thereafter, the following processing job is transferred to the calling source of the file system function (i.e., RETURN; step S45), and the processing returns to step S32.

If the file is not one as a target of encryption, or the encryption function is not brought into a valid mode by the switching module 72 (NO route of step S41), then the processing immediately proceeds to step S45. Further, if the access to the file as a target of encryption is not a reading access (NO route at step S42), the processing also immediately proceeds to step S45.

Now, the operation of the filtering module 70 will be described in a more concrete manner.

As described above, the encryption key is created by using information inherent to the application registered in the management table 61. For example, one of possible schemes is that the process ID assigned by the operating system 50 is utilized as described above.

If a file is enciphered with the process ID as an encryption key, the file can not be deciphered when another application as a target of registration tries to access the file. Because this application uses an encryption key different from the process ID. Moreover, even if the same application accesses the enciphered file as another trial, the enciphered file can also not be deciphered because the process ID created as an encryption key and utilized in this trial is different from the original process ID.

However, two applications can occasionally have the same process ID and an enciphered file can be unintentionally deciphered by accesses of the different registration target applications. In order to protect the enciphered file from being deciphered unintentionally in the above case, it is effective for the encryption key to be made inclusive of time information or the like together with the process ID. For example, the encryption key may be made inclusive of time information indicating a time when the access monitoring module 60 detects an access which is made by a registration target application to the copyright material. Further, the encryption key may be made inclusive of time information indicating a time when the access monitoring module 60 detects a file creation which is made by a registration target application. In this way, the encryption key is made inclusive of any time information to prohibit an identical encryption key creation. Because the operating system 50 never assigns an identical process ID to two or more processes at a time on the same system.

The encryption keys are reserved only within the filtering module 70 and hence they are not transmitted through a communication path or reserved in the storage units 10 and 20. Therefore, the encryption keys seldom suffers from a risk of theft. However, some operating systems allow a user to acquire a process ID in a relatively easy manner. If it is requested to ensure the protection of the encryption key, a work key, which is a pseudo-random number calculated on the basis of the above-described inherent information for the application, may be introduced in the encryption process.

As for an encryption algorithm for the data, since a file is handled as a byte series in an ordinary case, a block encryption system is appropriate.

The filtering module 70 hooks a file access from the operating system 50, whereby deciphering or enciphering is effected on the file (step S34 or S44). If the file access is a writing access, then the data (file) transferred by way of the operating system 50 is enciphered as described above and thereafter the resulting file is transferred to the file system 21. If the access is a reading access, the enciphered data transferred from the file system 21 is deciphered and the resulting file is transferred to the operating system 50.

Meanwhile, if a file as a target of encryption is created in a logical drive (or storage medium) identical to a logical drive (or storage medium) in which the copyright material registered in the management table 61 is stored, then the filtering module 70 becomes free from a task of enciphering or deciphering the encryption target file when the encryption file system is a particular type of one or an encryption file system is one which allows a cryptography attribute to be set for each file or folder.

Further, if a person such as an author himself or herself or a person who is licensed by the author of the copyright material creates a secondary copyright material such as when he or she edits the original copyright material, then the enciphering function and/or deciphering function of the filtering module 70 shall be made invalid.

To this end, according to the present embodiment, the filtering module 70 responds to a predetermined type of password entry so that the filtering module 70 is brought into an invalid mode in the enciphering function and/or deciphering function.

That is, when a user wants to change the mode of enciphering and/or deciphering of the filtering module 70 between the invalid mode and the valid mode, the user enters a password to the authentication module 71. The authentication module 71 compares the password inputted by the user with a corresponding password of the user registered in advance. If both of the passwords are coincident with each other, then the user entering the password is authorized. The switching module 72 changes the mode of the filtering module 70 from the valid status into the invalid status only when the authentication module 71 successfully carries out the authentication process to authorize the user entering the password.

As described above, according to the data management system of the first embodiment of the present invention, when an application accesses contents stored in the storage units 10 and 20 having an encryption function, the access monitoring module 60 monitors the status of access so that the status of access is placed under management of the access monitoring module 60 at each application (process). Thus, the contents read and utilized by the application are enciphered and/or deciphered by the filtering module 70 by using the process ID serving as inherent information of the application.

When the application utilizes the copyright material data which are enciphered by the encryption file system 11 and stored in the storage 10, it is necessary for the enciphered data to be once deciphered. Thus, the deciphered copyright material can be involved in a group of files created by the application. Therefore, according to the present embodiment, at least when the application accesses the enciphered copyright material, the access monitoring module 60 registers the inherent information of the application and the name of file which the application tries to create newly, in the management table 61. In this way, when the application tries to store a file not in the storage unit 10 serving as a reading source and having an encryption function but in the storage unit 20 having no encryption function, the filtering module 70 will not miss the enciphering process for the file.

According to the above arrangement, even if the user is placed under an environment where the storage unit 20 having no encryption function and the storage unit 10 having an encryption function are utilized in a mixed fashion, and the user drives the data management system in such a manner that the application reads the enciphered contents (copyright material) stored in the storage unit 10 having an encryption function and temporarily stores the contents as a new file in the storage unit 20 having no encryption function, the following advantages can be obtained. That is, the copyright concerning the material can be comfortably utilized by an authorized user, i.e., the copyright can be free from unreasonable restriction, the copyright of the contents released from encryption can be reliably protected, and great contribution can be expected to the performance improvement in the data management system.

In other words, when digitized copyright material data (digital contents) is stored in the storage unit 20 having no encryption function, the digitized copyright material data is once enciphered and thereafter stored in the storage unit 20. Therefore, the copyright of the material data can be effectively protected from a copyright infringement which can be brought about when the user unintentionally transfers the copyright material data to a third party who is unauthorized in executing the copyright. Moreover, if a malicious person tries to detach the storage unit 20 from the system and open the file containing the copyright material data, this person will surely fail in obtaining meaningful data because the data are fundamentally composed of a ciphertext. Thus, the copyright of the material data is effectively protected from infringement.

When the application creates a new file in the storage units 10 and 20 which are identical to those from which the application reads material data, and stores the contents in the newly created file, the contents are written in accordance with a file system which is arranged at each storage unit 10, 20. That is, if the application accesses contents stored in a file which are originally not enciphered, then the contents are written into the storage unit 20 without undergoing the enciphering process. On the other hand, if the application reads contents from an encryption file of a logical drive placed under management of the encryption file system 11, creates a new file other than the source of reading, and stores the contents (copyright material) in the newly created file, then the contents (file) are enciphered by using inherent information of the application (process ID). Therefore, only the application having created the file is allowed to decipher the contents (file) and utilize the same until the application terminates the processing.

In this case, one of recommendable arrangement is that dynamically determined information such as the process ID assigned by the operating system 50 is utilized as inherent information for the application, and this information is utilized for enciphering the contents. With this arrangement, even if the application identical to the application activated upon enciphering the contents is activated for deciphering the contents, the contents will be resistant to the deciphering process because of the difference in timing of activation. Accordingly, data deciphered by means of the file created in the storage unit 20 having no encryption function will not go into a transaction process with ease, with the result that the copyright can be more reliably protected from infringement.

Further, the data management system may be arranged so that the filtering module 70 is switched from the valid mode to the invalid mode in its operation only when the user authentication is successfully carried out, and the copyright holder himself or herself or a person licensed by the copyright holder (e.g., a person creating a secondary copyright material by editing the original material) are registered in advance in the data management system. With this arrangement, the copyright holder himself or herself or the person licensed by the copyright holder can make the filtering module 70 invalid in its operation (process of enciphering or deciphering). Thus, the editing work or the like will not suffer from unreasonable restriction, the copyright will be free from restriction upon executing the copyright, with the result that it becomes possible to avoid copyright infringement.

Further, according to the arrangement of the present embodiment, the storage unit 10 (logical drive #S0) has a cryptography attribute determined at each of files or folders containing contents, the contents are enciphered at each of the files or folders in advance, and thereafter the resulting contents (copyright material) are stored in the storage unit 10 under the management of the encryption file system 11. Alternatively, the file system as a whole is enciphered and the resulting contents (copyright material) are stored in the storage unit 10 under the management of the encryption file system 11. In this way, the digitized copyright material are once enciphered and thereafter stored in the storage unit 10. Therefore, the copyright of the material data can be effectively protected from a copyright infringement which can be brought about when the user unintentionally transfers the copyright material data to a third party who is unauthorized in executing the copyright. Moreover, if a malicious person tries to detach the storage unit 10 from the system and open the file containing the copyright material data, this person will surely fail in obtaining meaningful data because the data are fundamentally composed of a ciphertext. Thus, the copyright of the material data is effectively protected from infringement.

Furthermore, according to the arrangement of the present embodiment, the aforesaid Function (5) of the access monitoring module 60 is introduced, and when a file of an enciphered version is newly created, a part of the file name or the whole of the file name is changed and the resulting file name is registered in the management table 61, whereby the filtering module 70 temporarily stores the newly created file in the primary memory means as a memory file instead of the logical drive as a destination of storage. In this way, the newly created file is once enciphered by the filtering module 70 and thereafter stored in the primary memory means. Accordingly, if the power supply is once cut, the enciphered file stored in the primary memory means is erased, i.e., the enciphered file will not be held in the primary memory means, with the result that the copyright of the material data is more effectively protected from infringement.

Figure 4:
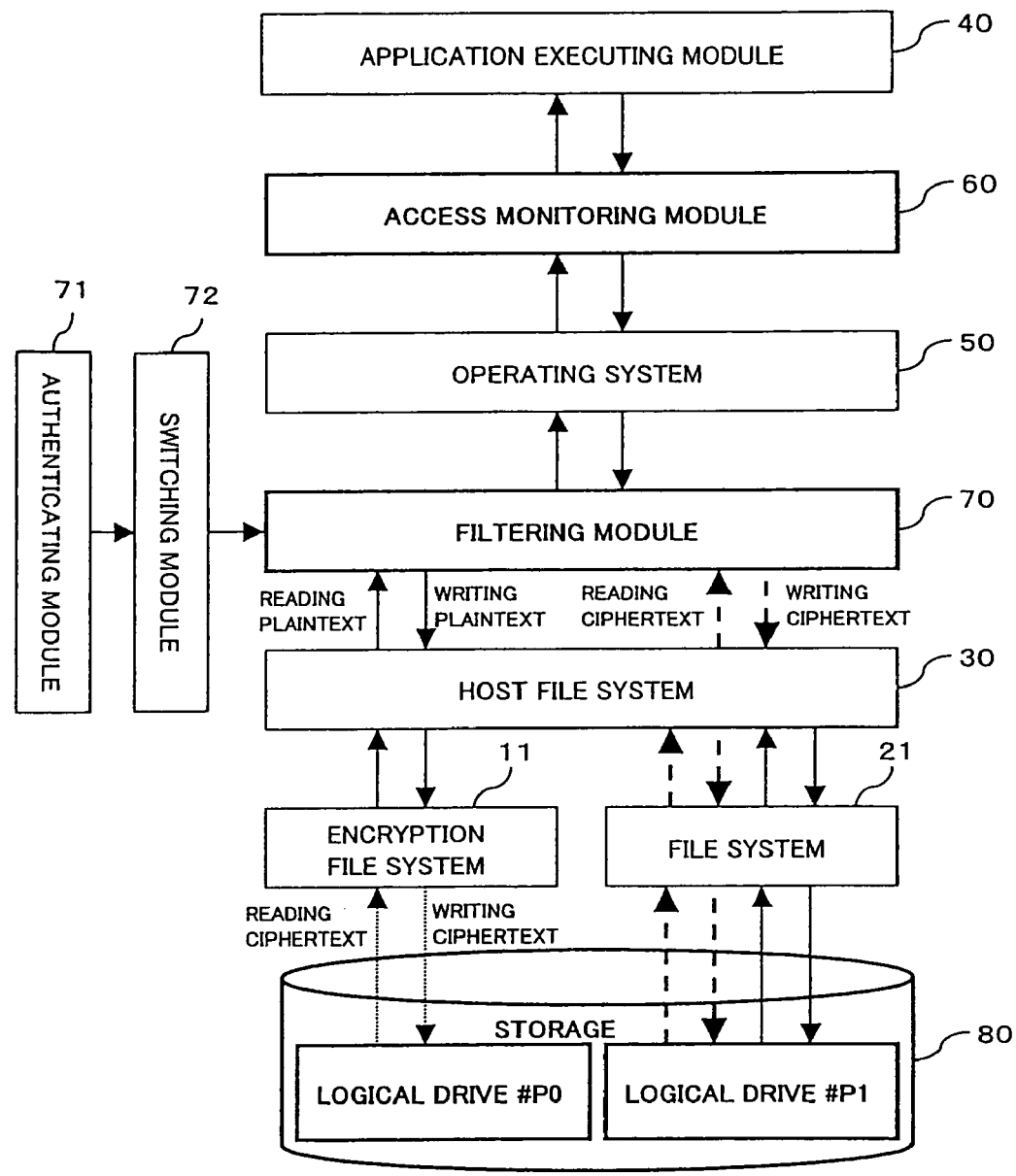
FIG. 4 is a block diagram showing an arrangement of a modification of the data management system as the first embodiment.

FIG. 4 is a block diagram showing an arrangement of a modification of the data management system as the first embodiment. In FIG. 4, like parts or substantially the same parts corresponding to those having described above are identified by the same reference numerals. Therefore, they will not be described.

In the data management system of the first embodiment illustrated in FIG. 1, description has been made on the arrangement in which a couple of storage units 10 and 20 are provided and a single unit of logical drive #S0, #S1 is built in each of the storage units 10 and 20. However, as shown in FIG. 4, a single unit of storage unit (storage medium) 80 may be provided instead of the couple of storage units 10 and 20, the storage unit 80 may be arranged to have a plurality of partitions (in the case of FIG. 4, there are two partitions), and these partitions are arranged to serve as logical drives #P0, #P1, respectively.

In this case, the logical drive #P0 is placed under the management of the encryption file system 11 and functions as a storage medium having an encryption function (corresponding to the logical drive #S0 of FIG. 1). Conversely, the logical drive #P1 is placed under the management of the file system 21 and functions as a storage medium having no encryption function (corresponding to the logical drive #S1 of FIG. 1).

Also in this case, the present invention can be applied to the modification in a manner similar to that of the above-described first embodiment.

Figure 5:
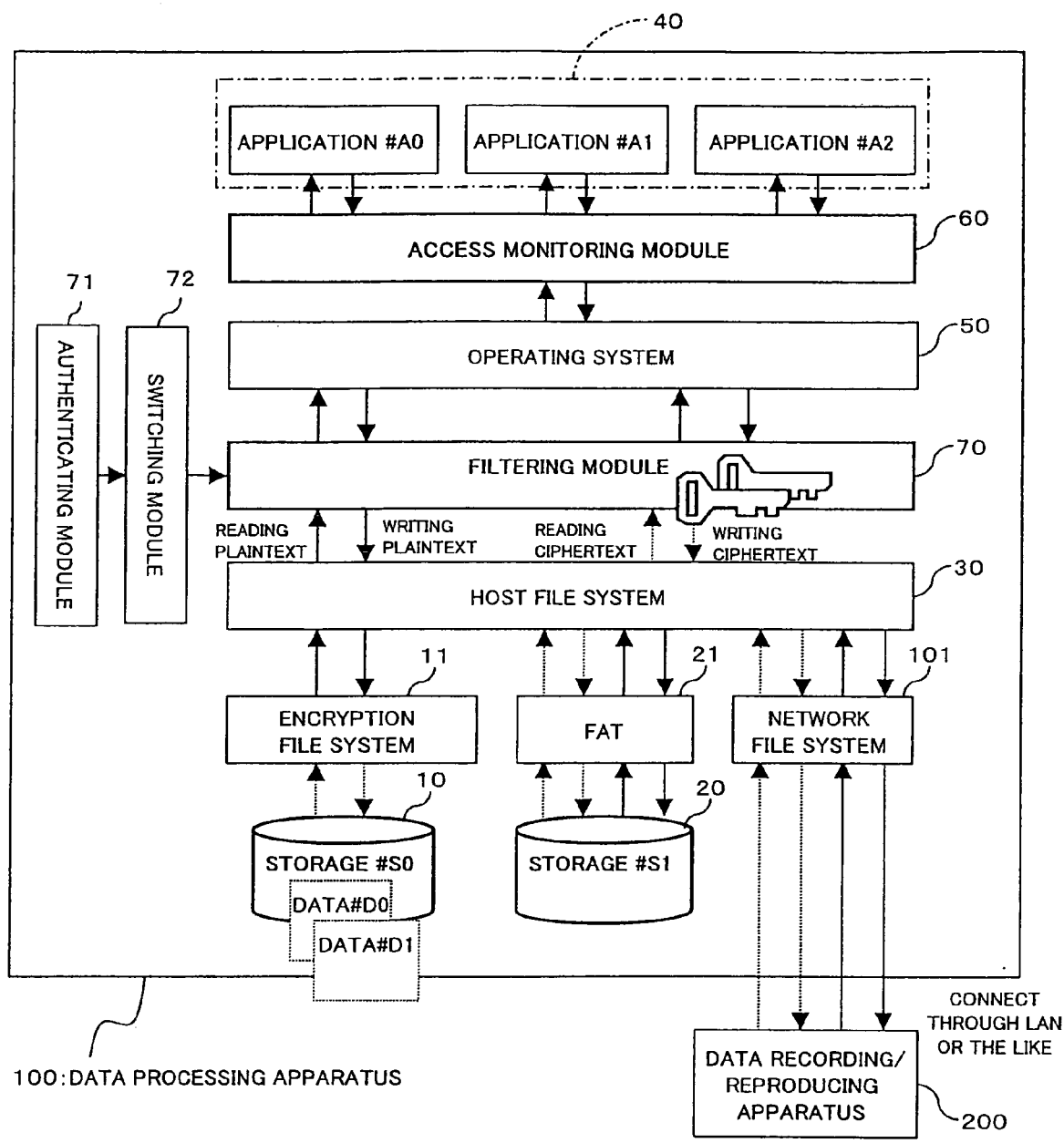
FIG. 5 is a block diagram showing an arrangement of a data management system as a second embodiment of the present invention.

FIG. 5 is a block diagram showing an arrangement of the data management system as a second embodiment of the present invention. As shown in FIG. 5, the data management system as the second embodiment is arranged similarly to that of the first embodiment. However, the data management system as the second embodiment consists of a data processing apparatus 100 such as a general-purpose personal computer and a data recording reproducing apparatus 200 connected to the data processing apparatus 100 by way of a wired network such as a LAN (Local Area Network) or a wireless network. In FIG. 5, like parts or substantially the same parts corresponding to those having described above are identified by the same reference numerals. Therefore, they will not be described.

The data processing apparatus 100 is arranged to include the storage unit 10, the encryption file system 11, the storage unit 20, the file system 21, the host file system 30, the application executing module 40, the operating system 50, the access monitoring module 60, the filtering module 70, the authenticating module 71, and the switching module 72, each of which components has been described in the description of the first embodiment. In addition, the data processing apparatus 100 further includes a network file system 101.

The network file system 101 functions as an interface between an external wired network or a wireless network and the data management system. Further, the network file system 101 manages a storage unit (storage medium) having no encryption function in the data recording reproducing apparatus 200.

The data recording reproducing apparatus 200 functions as a second storage apparatus for storing therein contents (copyright material file or copyright material data) enciphered by the filtering module 70. Thus, the data recording reproducing apparatus 200 substantially serves as the storage unit 20 having no encryption function. The data processing apparatus 100 accesses the storage unit provided in the data recording reproducing apparatus 200 through the network file system 101. Data read from the storage in the data recording reproducing apparatus 200 remains a ciphertext version until the data is received by the data processing apparatus 100 through the network. The processing sequence to which the data is subjected is similar to that of the first embodiment. Thus, it will not be described.

As described above, according to the data management system as the second embodiment of the present invention, advantages similar to those of the first embodiment can be obtained. Moreover, even if a user tries to duplicate the data through the network by accident, there is no fear of copyright infringement.

Figure 6:
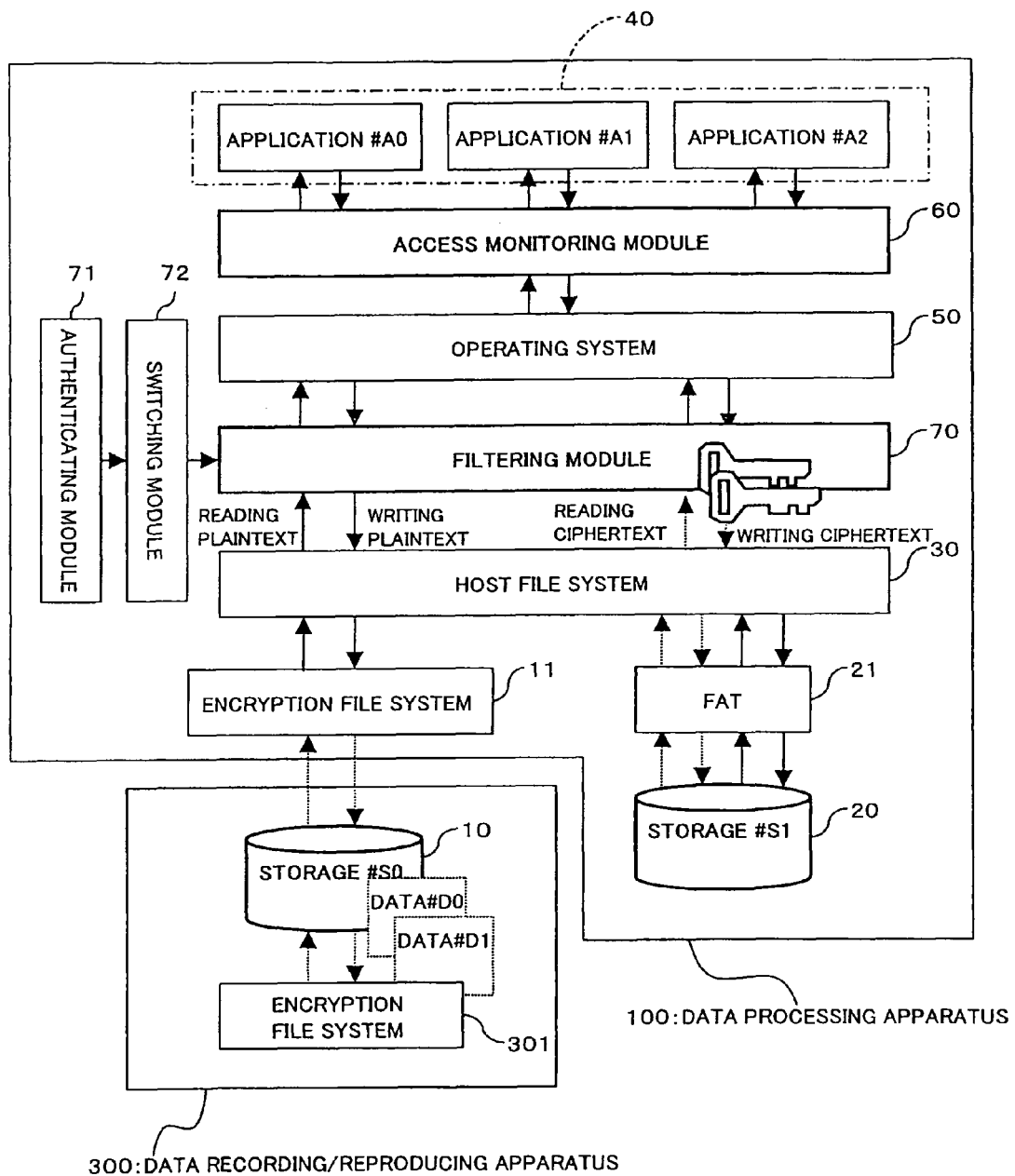
FIG. 6 is a block diagram showing an arrangement of a data management system as a third embodiment of the present invention.
Figure 7:
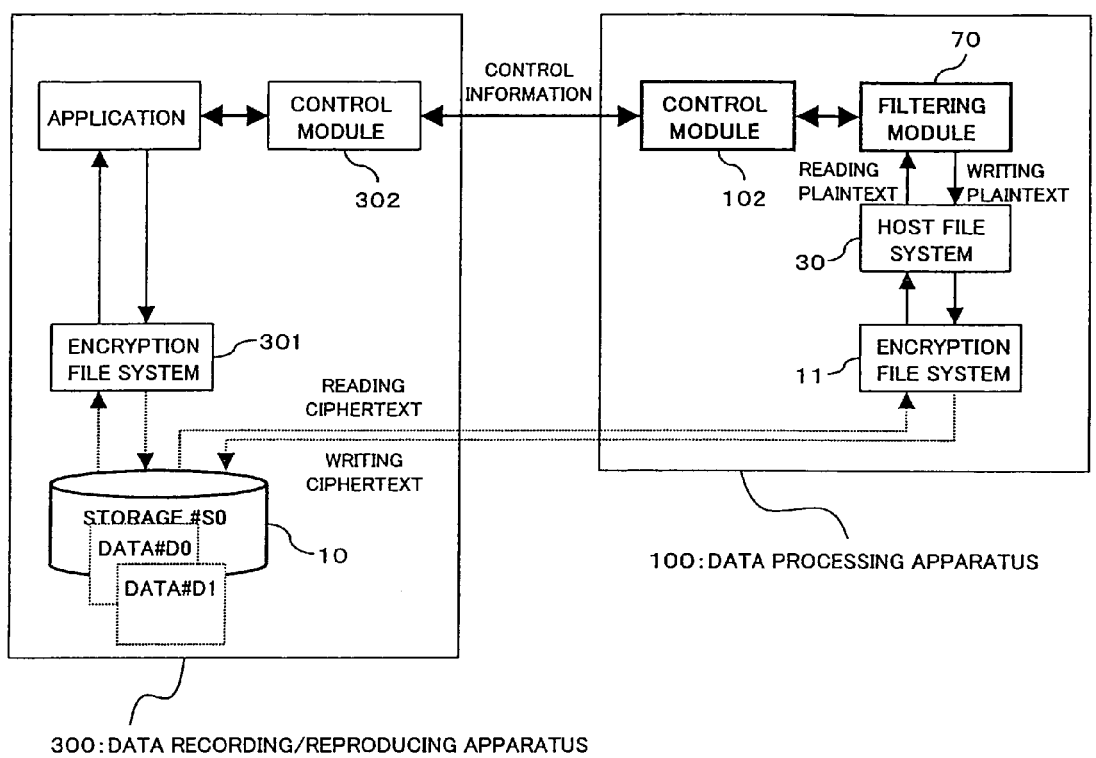
FIG. 7 is a diagram for explaining a scheme of exclusive control effected in the data management system as the third embodiment.

FIG. 6 is a block diagram showing an arrangement of the data management system as a third embodiment of the present invention and FIG. 7 is a diagram for explaining a scheme of exclusive control effected in the data management system as the third embodiment.

As shown in FIG. 6, the data management system of the third embodiment also consists of the data processing apparatus 100 such as a general-purpose personal computer and a data recording reproducing apparatus 300 such as a hard disk drive recorder attached to the outside of the data processing apparatus 100. In FIGS. 6 and 7, like parts or substantially the same parts corresponding to those having described above are identified by the same reference numerals, and they will not be described.

The data processing apparatus 100 of the third embodiment is arranged to include the encryption file system 11, the storage unit 20, the file system 21, the host file system 30, the application executing module 40, the operating system 50, the access monitoring module 60, the filtering module 70, the authenticating module 71, and the switching module 72, each of which components has been described in the description of the first embodiment. The storage unit 10 is involved in the data recording reproducing apparatus 300 attached to the outside of the data processing apparatus 100. In other words, according to the arrangement of the third embodiment, the data recording reproducing apparatus 300 functions as the first storage apparatus, including a logical drive, managed by the encryption file systems 11 and 301.

The data recording reproducing apparatus 300 is provided with the encryption file system 301 for managing the storage unit 10. As shown in FIG. 7, also in the data recording reproducing apparatus 300 of the third embodiment, the application is activated so that the application accesses a file of copyright materials stored in the storage unit 10 which is managed by the encryption file system 301.

The data processing apparatus 100 and the data recording reproducing apparatus 300 are connected to each other through an external interface such as of UBS (Universal Serial Bus), SCSI (Small Computer System Interface), IEEE (Institute of Electrical and Electronics Engineers) 1394. The data processing apparatus 100 accesses the storage unit 10 while effecting an exclusive control on the access of the data recording reproducing apparatus 300 to the storage unit 10.

In the above-described second embodiment, the data processing apparatus 100 accesses the storage unit of the data recording reproducing apparatus 200 through a network file system 101, so that the data recording reproducing apparatus 200 provides file access services. However, the arrangement of the third embodiment is different from that of the second embodiment in the following point. That is, in the third embodiment, the encryption file system 11 on the side of the data processing apparatus 100 directly accesses the storage unit 10 of the data recording reproducing apparatus 300. The processing sequence to which the data is subjected is similar to that of the first embodiment. Thus, it will not be described.

In the arrangement of the third embodiment, the storage unit 10 in the data recording reproducing apparatus 300 is accessed by both of the application installed in the data recording reproducing apparatus 300 and the application installed in the data processing apparatus 100. Therefore, it is necessary to effect exclusive control on the accesses by both of the applications.

A scheme of the exclusive control effected in the data management system of the third embodiment will be described with reference to FIG. 7. In FIG. 7, only a main portion of the data management system of the third embodiment is illustrated.

As shown in FIG. 7, the data processing apparatus 100 is provided with a control module 102 and the data recording reproducing apparatus 300 is provided with a control module 302. The control modules 102 and 302 are connected to each other through the above-described external interface. Control information (exclusive control signal) for carrying out the exclusive control is exchanged between the data processing apparatus 100 and the data recording reproducing apparatus 300.

Further, as shown in FIG. 7, the data processing apparatus 100 and the data recording reproducing apparatus 300 jointly have a data exchange channel for exchanging information about access to the storage unit (ciphertext reading or ciphertext writing) through the above-described external interface, in addition to the aforesaid data exchange channel for exchanging the control information.

In this case, all kinds of access rights for accessing the storage unit may be placed under the exclusive control. Alternatively, only an access right concerning the write access may be placed under the exclusive control.

According to the former scheme of the exclusive control, when one of the two components, i.e., the data processing apparatus 100 and the data recording reproducing apparatus 300, is accessing the storage unit 10, any access from the other component is prohibited. Conversely, according to the latter scheme of the exclusive control, when one of the data processing apparatus 100 and the data recording reproducing apparatus 300 is making a write access to the storage unit 10, the other of the components is permitted to make a read access. If the other of the component tries to make a write access, the component is brought into an awaiting mode. Read access is allowed for both of the components at a time. Whenever access right is transferred from one component to the other component, contents of a cache memory provided in the encryption file systems 11, 301 and so on shall be wholly erased, and then the data processing apparatus 100 or the data recording reproducing apparatus 300 shall try to write data in the storage unit 10. Further, when one of the components takes the access right, the component shall again read management information of the encryption file systems 11, 301 at least before writing operation is started.

As described above, according to the data management system as the third embodiment of the present invention, advantages similar to those of the first or second embodiment can be obtained.

While several embodiments and modifications have been described above, the present invention is not limited to these embodiments but various changes and modifications other than the above embodiments can be effected without departing from the gist of the present invention.

For example, according to the arrangement of the several embodiments of the present invention, the authenticating module 71 carries out authentication process by using a password. However, the present invention is not limited to such an arrangement but the authentication process may be carried out by using biometric information such as fingerprints, voiceprints, iris patterns, handprints and so on.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A data management comprising:

a storage medium for storing contents;

application executing means for activating an application so that the application accesses the contents stored in the storage medium and effects a processing on the contents;

access monitoring means for monitoring the status of access of the application to the contents by associating inherent information for the application brought into an activated status by the application executing means, with inherent information for the contents accessed by the application;

filtering means for enciphering the contents with the inherent information for the application when the application under the activated status writes the contents into the storage medium while deciphering the contents with the inherent information for the application when the application under the activated status reads out the contents in the storage medium, and an operating system as a software for controlling the execution of the application, wherein the operating system assigns identification information to each process upon executing the application by the application executing means, and the access monitoring means utilizes the identification information as the inherent information for the application, wherein the access monitoring means registers the inherent information for the application and the inherent information for the contents in a management table so that the inherent information for the application and the inherent information for the contents are associated with each other, and the access monitoring means monitors the status of access with the assistance of the management table, and wherein at least one piece of logical drive is built in the storage medium and the contents is reserved in the logical drive, a file system for managing the logical drive is built in each of the logical drive, and at least one file system is arranged to serve as an encryption file system which enciphers the file system as a whole upon storing the contents in the storage medium, wherein the access monitoring means compares a drive name of the logical drive as a destination for storing a file, which is newly created when the application effects a processing on the contents, with a drive name of the logical drive registered in the management table, and if it is determined that both of the drive names disagree with each other as the result of comparison, the access monitoring means changes a file name of the newly created file so that the newly created file is stored in the logical drive of the drive name registered in the management table and registers the changed file name in the management table, wherein when the application reads the contents stored in the logical drive managed by the encryption file system, the access monitoring means registers a drive name of the logical drive containing the contents read out by the application in the management table as the inherent information for the contents.

2. A data management system according to claim 1, wherein when the application effects a processing on the contents to create a new file, the access monitoring means registers a file name generated for the new file in the management table so that the file name and the inherent information for the application are associated with each other.

3. A data management system according to claim 2, wherein the access monitoring means changes the file name of the new file partly or wholly, and registers the changed name in the management table.

4. A data management system according to claim 1, wherein the storage medium comprises a first storage unit including the logical drive managed by the encryption file system and a second storage unit for storing therein the contents enciphered by the filtering means.

5. A data management system according to claim 4, wherein the application executing means, the access monitoring means, the filtering means and the first storage means are provided within a single unit of data processing apparatus, and the second storage unit is connected to the data processing apparatus by way of a network.

6. A data management system according to claim 4, wherein the application executing means, the access monitoring means, the filtering means and the second storage means are provided within a single unit of data processing apparatus, and the first storage means is involved in a data recording reproducing apparatus attached outside the data processing apparatus.

7. A data management system according to claim 1, further comprising:

authenticating means for carrying out authentication on a user; and switching means for switching the mode of operation of the filtering means between a valid mode and an invalid mode only when the authenticating means successfully carries out the authentication on the user.

8. A data management system comprising:

a storage medium for storing contents;

application executing means for activating an application so that the application accesses the contents stored in the storage medium and effects a processing on the contents;

access monitoring means for monitoring the status of access of the application to the contents by associating inherent information for the application brought into an activated status by the application executing means, with inherent information for the contents accessed by the application;

filtering means for enciphering the contents with the inherent information for the application when the application under the activated status writes the contents into the storage medium while deciphering the contents with the inherent information for the application when the application under the activated status reads out the contents in the storage medium, and an operating system as a software for controlling the execution of the application, wherein the operating system assigns identification information to each process upon executing the application by the application executing means, and the access monitoring means utilizes the identification information as the inherent information for the application, wherein the access monitoring means registers the inherent information for the application and the inherent information for the contents in a management table so that the inherent information for the application and the inherent information for the contents are associated with each other, and the access monitoring means monitors the status of access with the assistance of the management table, and wherein at least one piece of logical drive is built in the storage medium and the contents is reserved in the logical drive, a file system for managing the logical drive is built in each of the logical drive, and at least one file system is arranged to serve as an encryption file system which enciphers the file system as a whole upon storing the contents in the storage medium, wherein the access monitoring means compares a drive name of the logical drive as a destination for storing a file, which is newly created when the application effects a processing on the contents with a drive name of the logical drive registered in the management table, and if it is determined that both of the drive names are coincident with each other as the result of comparison, then the access monitoring means prohibits a file name of the newly created file from being registered in the management table, wherein when the application reads the contents stored in the logical drive managed by the encryption file system, the access monitoring means registers a drive name of the logical drive containing the contents read out by the application in the management table as the inherent information for the contents.

9. A data management system comprising:

a storage medium for storing contents;

application executing means for activating an application so that the application accesses the contents stored in the storage medium and effects a processing on the contents;

access monitoring means for monitoring the status of access of the application to the contents by associating inherent information for the application brought into an activated status by the application executing means, with inherent information for the contents accessed by the application;

filtering means for enciphering the contents with the inherent information for the application when the application under the activated status writes the contents into the storage medium while deciphering the contents with the inherent information for the application when the application under the activated status reads out the contents in the storage medium, and an operating system as a software for controlling the execution of the application, wherein the operating system assigns identification information to each process upon executing the application by the application executing means, and the access monitoring means utilizes the identification information as the inherent information for the application, wherein the access monitoring means registers the inherent information for the application and the inherent information for the contents in a management table so that the inherent information for the application and the inherent information for the contents are associated with each other, and the access monitoring means monitors the status of access with the assistance of the management table, and wherein at least one piece of logical drive is built in the storage medium and the contents is reserved in the logical drive, a file system for managing the logical drive is built in each of the logical drive, and at least one file system is arranged to serve as an encryption file system which enciphers the file system as a whole upon storing the contents in the storage medium, wherein the access monitoring means compares a drive name of the logical drive as a destination for storing a file, which is newly created when the application effects a processing on the contents, with a drive name of the logical drive registered in the management table, and if it is determined that both of the drive names disagree with each other as the result of comparison, then the operation of the filtering means is validated, wherein when the application reads the contents stored in the logical drive managed by the encryption file system, the access monitoring means registers a drive name of the logical drive containing the contents read out by the application in the management table as the inherent information for the contents..

10. A data management system according to claim 9, wherein the storage medium comprises a primary storage means which erases data stored therein upon power supply cut, and the filtering means stores an enciphered version of the newly created file in the primary storage means instead of the logical drive as the storage destination.

* * * * *

UNITED STATES PATENT AND TRADEMARK OFFICE
CERTIFICATE OF CORRECTION

| | | |
|---|---|---|
| PATENT NO. | : 7,877,616 B2 | Page 1 of 1 |
| APPLICATION NO. | : 12/010748 | |
| DATED | : January 25, 2011 | |
| INVENTOR(S) | : Yukihiro Abiko et al. | |

It is certified that error appears in the above-identified patent and that said Letters Patent is hereby corrected as shown below:

Column 24, Line 2 in Claim 9, delete "contents.." and insert -- contents. --, therefor.

Signed and Sealed this
Fifth Day of April, 2011

David J. Kappos
*Director of the United States Patent and Trademark Office*